United States Patent
Kim et al.

(10) Patent No.: US 9,408,086 B2
(45) Date of Patent: Aug. 2, 2016

(54) CHANNEL STATE INFORMATION FEEDBACK APPARATUS AND METHOD IN WIRELESS COMMUNICATION SYSTEM OPERATING IN FDD MODE

(71) Applicants: Samsung Electronics Co., Ltd., Gyeonggi-do (KR); Industry-Academic Cooperation Foundation, Korea National University of Transportation, Chungju-si, Chungcheongbuk-do (KR)

(72) Inventors: Kiil Kim, Gyeonggi-do (KR); Cheol Mun, Chungcheongbuk-do (KR); Younsun Kim, Gyeonggi-do (KR); Juho Lee, Gyeonggi-do (KR); Hyojin Lee, Seoul (KR); Joonyoung Cho, Gyeonggi-do (KR)

(73) Assignees: Samsung Electronics Co., Ltd. (KR); Industry-Academic Cooperation Foundation, Korean National University of Transportation (KR)

( * ) Notice: Subject to any disclaimer, the term of this patent is extended or adjusted under 35 U.S.C. 154(b) by 477 days.

(21) Appl. No.: 13/728,510

(22) Filed: Dec. 27, 2012

(65) Prior Publication Data

US 2013/0163457 A1 Jun. 27, 2013

(30) Foreign Application Priority Data

Dec. 27, 2011 (KR) .................. 10-2011-0143631

(51) Int. Cl.
*H04L 1/00* (2006.01)
*H04W 24/02* (2009.01)
(Continued)

(52) U.S. Cl.
CPC ............. *H04W 24/02* (2013.01); *H04B 7/0417* (2013.01); *H04L 5/0023* (2013.01); *H04B 7/0478* (2013.01); *H04B 7/0639* (2013.01); *H04L 25/0204* (2013.01); *H04W 16/28* (2013.01); *H04W 72/085* (2013.01)

(58) Field of Classification Search
CPC .... H04B 7/0478; H04B 7/0417; H04W 16/28
See application file for complete search history.

(56) References Cited

U.S. PATENT DOCUMENTS

2005/0157683 A1* 7/2005 Ylitalo et al. ............... 370/334
2008/0008110 A1* 1/2008 Kishigami et al. ........... 370/310
(Continued)

FOREIGN PATENT DOCUMENTS

EP          1 981 198        10/2008
KR      1020080074419         8/2008
(Continued)

OTHER PUBLICATIONS

Jun Zhu, "Performance Evaluation of Low-Complexity Multi-Cell Multi-User MIMO Systems", University of Victoria, Apr. 29, 2011.
(Continued)

*Primary Examiner* — Shaq Taha
(74) *Attorney, Agent, or Firm* — The Farrell Law Firm, P.C.

(57) ABSTRACT

A Channel State Information (CSI) feedback method and apparatus is provided for transmitting, at a base station, the CSIs for plural transmit antennas with a limited amount resource and receiving, at a mobile station, the CSIs efficiently in a massive Multiple Input Multiple Output (MIMO) system operating in the Frequency Division Duplex (FDD) mode.

12 Claims, 6 Drawing Sheets

(51) Int. Cl.
*H04L 5/00* (2006.01)
*H04B 7/04* (2006.01)
*H04W 16/28* (2009.01)
*H04W 72/08* (2009.01)
*H04L 25/02* (2006.01)
*H04B 7/06* (2006.01)

(56) References Cited

U.S. PATENT DOCUMENTS

| | | | |
|---|---|---|---|
| 2008/0165875 A1* | 7/2008 | Mundarath et al. | 375/262 |
| 2008/0192811 A1* | 8/2008 | Son | 375/219 |
| 2008/0227495 A1* | 9/2008 | Kotecha et al. | 455/562.1 |
| 2008/0318606 A1 | 12/2008 | Tsutsui et al. | |
| 2009/0060082 A1* | 3/2009 | Yuda et al. | 375/267 |
| 2010/0104033 A1* | 4/2010 | Gorokhov | 375/260 |
| 2010/0177742 A1* | 7/2010 | Tang et al. | 370/335 |
| 2010/0203912 A1 | 8/2010 | Ashikhmin et al. | |
| 2010/0232525 A1* | 9/2010 | Xia | H04B 7/0626 375/259 |
| 2010/0233973 A1* | 9/2010 | Churan | 455/114.2 |
| 2010/0316145 A1 | 12/2010 | Yeh et al. | |
| 2011/0065448 A1 | 3/2011 | Song et al. | |
| 2011/0274185 A1* | 11/2011 | Gan et al. | 375/259 |
| 2013/0021925 A1* | 1/2013 | Yin et al. | 370/252 |
| 2013/0039326 A1* | 2/2013 | Kim et al. | 370/329 |
| 2013/0083681 A1* | 4/2013 | Ebrahimi Tazeh Mahalleh | H04L 5/0057 370/252 |
| 2013/0201912 A1* | 8/2013 | Sheng et al. | 370/328 |

FOREIGN PATENT DOCUMENTS

| | | |
|---|---|---|
| KR | 1020090027856 | 3/2009 |
| KR | 1020110014187 | 2/2011 |

OTHER PUBLICATIONS

Phoenix Yuan et al., Hybrid Analog/Digital CSI Feedback for Transmit Beamforming Systems in Time-Selective Fading Channels, 2010 IEEE Vehicular Technology Conference (VTC 2010-Spring), May 16-19, 2010, 5 pages.

European Search Report dated Jul. 29, 2015 issued in counterpart application No. 12861618.2-1852, 8 pages.

* cited by examiner

CHANNEL STATE INFORMATION FEEDBACK APPARATUS AND METHOD IN WIRELESS COMMUNICATION SYSTEM OPERATING IN FDD MODE

PRIORITY

This application claims priority under 35 U.S.C. §119(a) to a Korean Patent Application filed in the Korean Intellectual Property Office on Dec. 27, 2011 and assigned Serial No. 10-2011-0143631, the contents of which are incorporated herein by reference.

BACKGROUND OF THE INVENTION

1. Field of the Invention

The present invention relates generally to a massive Multiple-Input Multiple-Output (MIMO) system operating in Frequency Division Duplex (FDD) mode and, in particular, to a method and apparatus of feeding back downlink channel state information efficiently with a limited amount of information in the massive MIMO system.

2. Description of the Related Art

As one of the key communication techniques to be adopted to the next generation mobile communication systems, studies are being conducted on the massive MIMO technique in which a base station equipped with multiple transmit antennas transmits data to a plurality of mobile stations on the basis of multi-user MIMO scheme. The transmit beamforming gain is logically in proportion to a number of transmit antennas. When exploiting the high beamforming gain of the massive MIMO system equipped with plural transmit antennas, it is possible to reduce the transmit power of each antenna. In this respect, massive MIMO is emerging as an important green communication technology.

In order to form the transmit beams of the massive MIMO system, the transmitter has to receive the downlink Channel State Information (CSI) for each downlink. In the Time Division Duplex (TDD) system, the downlink channel estimation technique based on Sounding Reference Signal (SRS) has been disclosed. However, this technique has a drawback in that uplink SRS's vulnerability to inter-cell interference degrades the channel estimation performance, resulting in reduction of system throughput.

In the legacy FDD Long Term Evolution-Advanced (LTE-A) system, the Channel State Information Reference Signal (CSI-RS) symbols are mapped to the Resource Elements (REs) on different carriers in the frequency domain and at different OFDM symbols in the time domain or multiplied by orthogonal codes to maintain orthogonality between transmit antenna ports at every downlink slot. The mobile station estimates the CSI-RS symbols mapped to the REs at the positions to measure downlink channel states associated with the respective transmit antennas. If the massive MIMO technique is adopted to the legacy MIMO system without modification, the transmitter will have to transmit CSI-RS as many as the number of the transmit antennas and thus, the receiver will have to feed back the downlink channel information as much as the number of transmit antennas.

Accordingly, the transmitter will have to allocate a few hundred of REs for CSI-RS transmission so as to reduce the number of REs for data transmission, resulting in a reduction of downlink data transmission capacity. In addition, the downlink channel state information amount to be fed back by the mobile station will increase exponentially as the number of transmit antennas increases such that the number of REs for uplink data transmission decreases, resulting in reduction of uplink data transmission capacity.

SUMMARY OF THE INVENTION

The present invention has been made in an effort to solve the above problems, and it is an object of the present invention to provide a Channel State Information feedback method that is capable of transmitting, at a base station, the CSIs for plural transmit antennas with a limited amount resource and receiving, at a mobile station, the CSIs efficiently in a massive MIMO system operating in the FDD mode.

It is another object of the present invention to provide a CSI feedback method that is capable of transmitting feedback information efficiently with relatively small amount of resource that is disproportionate to the large number of transmit antennas of a transmitter transmitting the signals in the form of beams in a massive MIMO system operating in the FDD mode.

In accordance with an aspect of the present invention, a channel state information feedback method of a mobile station in a massive MIMO system includes estimating a channel vector comprising N channel coefficients from a base station, comparing result values of a function having input of the N channel coefficients among each other, selecting an index of a beam formed with a maximum value of the result values, selecting indices of beams of which are equal to or greater than a threshold value associated with the maximum result value, generating an active beam index set including the selected beam indices, estimating channel state information on the active beam index set, and feeding back the channel state information and the active beam index set to the base station.

In accordance with another aspect of the present invention, a channel state information feedback apparatus includes a radio communication unit which receives N channel coefficients from a base station, and a control unit which estimates a channel vector comprising N channel coefficients from a base station, compares result values of a function having input of the N channel coefficients among each other, selects an index of a beam formed with a maximum value of the result values, selects indices of beams of which are equal to or greater than a threshold value associated with the maximum result value, generates an active beam index set including the selected beam indices, estimates channel state information on the active beam index set, and feeds back the channel state information and the active beam index set to the base station.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention discloses a downlink channel state information feedback method that is capable of transmitting the feedback information with a limited resource amount not in proportion to the number of transmit antennas in a massive MIMO system operating in the FDD mode.

A. Massive MIMO System Model

The massive MIMO system involves a base station equipped with an antenna array of a few hundred of the transmit antennas which transmits data to a plurality of mobile stations simultaneously using an SDMA technique for beamforming. In the present invention, it is assumed that the transmitter uses M transmit antennas and the receiver uses one receive antenna in a massive MIMO system operating in the FDD mode.

The present invention is directed to the massive MIMO system of which transmitter performs beamforming on Channel State Information Reference Signal (CSI-RS). The MIMO transmitter transits to the mobile station the beams formed by precoding N per-beam signals with N beamforming vectors of size M. Accordingly, the reception performance for a specific beam improves dramatically even with the transmission at low power level per transmit antenna and, as a consequence, the mobile station is capable of estimating the channel information transmitted by plural transmit antennas.

In order accomplish this, the massive MIMO transmitter performs beamforming on the N per-beam signals $\{R_n\}_{n=0,\ldots,N-1}$ with N column vectors $\{u_n\}_{n=0,\ldots,N-1}$ of an N×N Discrete Fourier Transform (DFT) matrix U to transmit the signals as expressed by Equation (1) as follows:

$$X_n = R_n u_n, n = 0, 1, \ldots, N-1 \quad (1)$$

In order to guarantee orthogonality of N per-beam signals transmitted in the same subframe, N different resources are multiplexed in frequency domain according to a Frequency Division Multiplexing (FDM) scheme and in time domain according to a Time Division Multiplexing (TDM) scheme to the N per-beam signals.

The per-beam signals sharing a CSI-RS resource multiplexed in code, frequency, and time domains according to the CDM, FDM, and TDM schemes are multiplexed in space domain according to a Space Division Multiplexing (SDM) scheme so as to be transmitted as different beams capable of suppressing intra-channel interference due to the high spatial interference suppression performance of the massive MIMO system, even though the signals are mapped to the same resource.

The mobile station receives N orthogonal per-beam signals so as to estimate the channel vector $\tilde{h}_k$ composed of the channel coefficients that are beamformed with N weight vectors $\{u_n\}_{n=0,\ldots,N-1}$ and received at the $k^{th}$ mobile station as expressed by Equation (2) as follows:

$$\tilde{h}_k = [h_k u_0 \quad h_k u_1 \quad \ldots \quad h_k u_{N-1}] \quad (2)$$
$$= [\tilde{h}_{k,0} \quad \tilde{h}_{k,1} \quad \ldots \quad \tilde{h}_{k,N-1}]$$

where $h_k$ denotes the channel vector having a size 1×N transmitted from transmit antennas to $k^{th}$ receive antenna of the mobile station. $\tilde{h}_{k,n}$ denotes the channel coefficient beamformed with $n^{th}$ vector $u_n$ so as to be received at the $k^{th}$ mobile station and estimated with $n^{th}$ per-beam signal.

The massive MIMO uses an array antenna having a very large aperture formed with a few hundred transmit antennas. In this formation, the beamwidth of the main beam formed through beamforming is very narrow and has a sharp beam pattern. Accordingly, the massive MIMO has a high directivity so as to transmit the signal to a direction in a very limited azimuth range.

If the signal transmission direction of a beamforming weight is similar to the direction to the corresponding mobile station, the channel gain received with the corresponding beamforming weight is very large. Otherwise, if the signal transmission direction is different from the direction to the corresponding mobile station, the channel gain has a small value. For example, if the channel coefficients received with the $m^{th}$ and $(m+1)^{th}$ beamforming weight vectors have very large channel gain and if the channel coefficients received with the rest beamforming weight vectors have a small channel gain, the channel vector $\tilde{h}_k$ can be approximated by Equation (3) as follows:

$$\tilde{h}_k \sim [0 \ldots 0 \tilde{h}_{k,m} \tilde{h}_{k,m+1} 0 \ldots 0] \quad (3)$$

In the massive MIMO system having the transmitter configured to perform beamforming on the per-beam signals, the mobile station quantizes only a small number of principal channel coefficients having the channel gain greater than or equal to a value for feedback. That is, the mobile station is capable of feeding back the downlink channel state information to the transmitter using a limited feedback resource amount which is disproportionate to the number of transmit antennas.

B. Feedback Technique for Channel Approximation with Disclosed Principle Beam Summation In the feedback method for channel approximation with PBS, the mobile station feeds back the index of a channel coefficient (i.e. CSI-RS index or beam index) guaranteeing the gain over a level among N channel coefficients $\{\tilde{h}_{k,n}\}_{n=1,\ldots,N}$ along with the Channel Quality Information (CQI). This feedback method is capable of approximating the downlink channel state by summing DFT column vectors indicated by the beam indices fed back.

Figure 1:
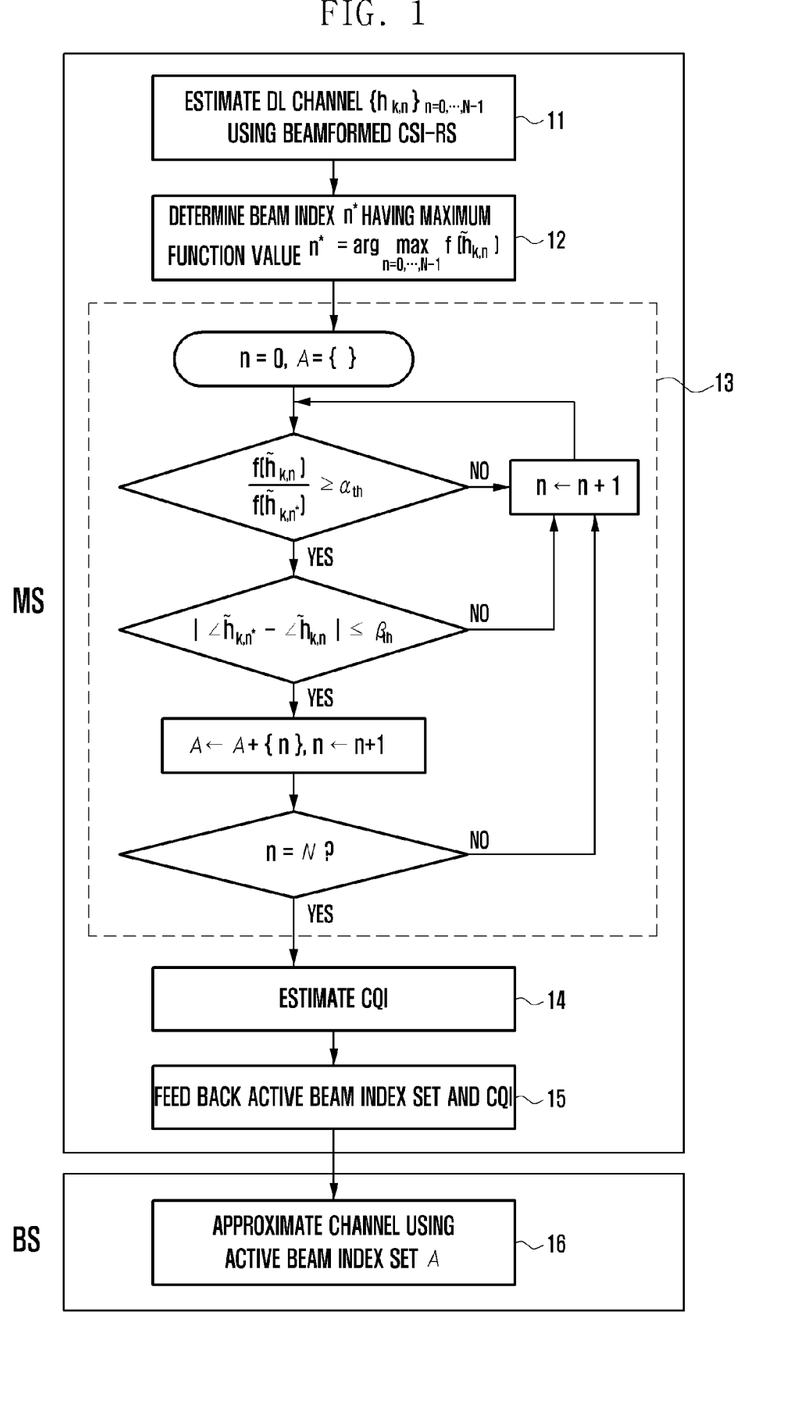
FIG. 1 illustrates the downlink channel information feedback method for channel approximation with Principal Beam Summation (PBS) according to an embodiment of the present invention.

FIG. 1 illustrates the downlink channel information feedback method for channel approximation with PBS according to an embodiment of the present invention.

Referring to FIG. 1, the mobile station estimates N orthogonal per-beam signals at step 11. That is, the mobile station estimates the channel vector $\tilde{h}_k$ composed of the channel coefficients that are beamformed with N weight vectors $\{u_n\}_{n=0,\ldots,N-1}$ and received by the receiver of each mobile station as expressed by Equation (2).

The mobile station compares the result values of a certain function $f(\cdot)$ with the input of N channel coefficients $\{\tilde{h}_{k,n}\}_{n=1,\ldots,N}$ with each other as expressed by Equation (4) as shown below, at step 12. The function $f(\cdot)$ can be defined as the function of a data rate available with $|\tilde{h}_{k,n}|$ as the size of the channel coefficient $\tilde{h}_{k,n}$ or the channel coefficient $\tilde{h}_{k,n}$ and Signal-to-Noise and Interference Ratio (SINR) that can be received with $\tilde{h}_{k,n}$.

$$n^* = \arg\max_{n=0,\ldots,N-1} f(\tilde{h}_{k,n}) \qquad (4)$$

The mobile station checks the result values of the function $f(\cdot)$ of N channel coefficients $\{\tilde{h}_{k,n}\}_{n=1,\ldots,N}$ as expressed by Formula (5) at step 13. The mobile station selects the beam indices of the beams for which the result values are equal to or greater than the size threshold $\alpha_{th}$ having a value of the maximum result value $f(\tilde{h}_{k,n}^*)$ selected at step 12, and the phase difference between the phase $\{\angle \tilde{h}_{k,n}\}_{n=0,\ldots,N-1}$ of the channel coefficients and phase $\angle \tilde{h}_{k,n}^*$ of the maximum result value $\tilde{h}_{k,n}^*$ is equal to or less than $\beta_{th}$ to be included in an active beam index set A.

$$n \in \mathcal{A}, \text{ if } \frac{f(\tilde{h}_{k,n})}{f(\tilde{h}_{k,n^*})} \geq \alpha_{th} \text{ and } |\angle \tilde{h}_{k,n^*} - \angle \tilde{h}_{k,n}| \leq \beta_{th} \qquad (5)$$

The mobile station performs this process for the total N beam indices.

The mobile station estimates CQI for the active beam index set A at step 14. The CQI can be determined in the format of transmittable data rate or receivable SINR. The mobile station feeds back the active beam index set A (determined at step 13) and CQI for the active beam index set A (determined at step 14) to the base station at step 15.

The selected active beam index and the CQI can be transmitted based on the following signaling. It is assumed that the active beam index set A includes L active beam indices.

$\{\mathcal{A}(0), CQI_{\mathcal{A}(0)}\}, \{\mathcal{A}(1), CQI_{\mathcal{A}(1)}\}, \ldots, \{\mathcal{A}(L-1), CQI_{\mathcal{A}(L-1)}\}$:

L messages, each including the each selected beam index $\mathcal{A}_{(l)}$ and $CQI_{\mathcal{A}(l)}$ as the CQI receivable with the corresponding beam, are fed back. $\{\mathcal{A}(0), \mathcal{A}(1), \ldots, \mathcal{A}(L-1)\}, \{CQI_A\}$:

The L selected active beam indices $\{A(l)\}_{l=0,\ldots,L-1}$ are grouped to be transmitted in an active beam index message. When estimating channels with summation of the L selected active beams, a receivable summation CQI message $\{CQI_A\}$ is fed back. The active beam indices are arranged in the active beam index message in highest CQI first order.

$\{\mathcal{A}(0), \mathcal{A}(1), \ldots, \mathcal{A}(L-1)\}, \{CQI_{\mathcal{A}(0)}, CQI_{\mathcal{A}(1)}, \ldots, CQI_{\mathcal{A}(L-1)}\}$:

The L selected active beam indices $\{A(l)\}_{l=0,\ldots,L-1}$ are grouped to be transmitted in an active beam index message. The individual CQIs $\{CQI_{\mathcal{A}(l)}\}_{l=0,\ldots,L-1}$ receivable with the corresponding beams are fed back in a CQI message. The active beam indices are arranged in the active beam index message in highest CQI first order and the individual CQIs are arranged in highest CQI first order.

$\{\mathcal{A}(0), \mathcal{A}(1), \ldots, \mathcal{A}(L-1)\}, \{CQI_{\mathcal{A}(0)}, CQI_{\mathcal{A}(1)}, \ldots, CQI_{\mathcal{A}(L-1)}\}, \{CQI_A\}$:

The L selected beam indices $\{A(l)\}_{l=0,\ldots,L-1}$ are grouped to be transmitted in an active beam index message. The individual CQIs $\{CQI_{\mathcal{A}(l)}\}_{l=0,\ldots,L-1}$ receivable with corresponding beams are fed back in a CQI message and a summation CQI message $\{CQI_A\}$ for the L selected active beams summated to be receivable together. The active beam indices are arranged in the active beam index message in a highest CQI first order and the individual CQIs are arranged in a highest CQI first order.

The base station estimates downlink channels to the corresponding mobile station at step 16 using the active beam index information and CQI information fed back (at step 15) by each mobile station. The downlink channel vector $\tilde{a}_k$ approximated for each mobile station is calculated by summing the weight vectors $\{u_{A(l)}\}_{l=0,\ldots,L-1}$ of L beams indicated by the selected L active beam indices $\{A(l)\}_{l=0,\ldots,L-1}$ and normalizing the summed values as expressed by the following Equation (6).

$$\tilde{a}_k = \frac{1}{L}\sum_{l=1}^{L} u_{A(l)} \qquad (6)$$

The parameters $\alpha_{th}$, size of the active beam index A (i.e. number of beam indices to be included in the set), and $\beta_{th}$ necessary for the mobile station to determine the active beam index can be defined to be set to common values for all connected mobile stations per base station or mobile station-specific values. These parameters can be set as specified in a standard followed by the base and mobile stations. The base station is capable of notifying all mobile stations of at least one of $\alpha_{th}$, size of active beam index set A, and $\beta_{th}$ through downlink RRC signaling.

C. Feedback Technique for Channel Approximation with Phase-Compensated Principal Beam Summation In the feedback method for channel approximation with PCPBS, the receiver feeds back the indices of the channel coefficients having a gain equal to or greater than a threshold among N channel coefficients $\{\tilde{h}_{k,n}\}_{n=1,N}$ (i.e. CSI-RS indices or beam indices) and the their phases as quantized along with CQI. The transmitter compensates the DFT column vectors indicated by the beam indices with the received phase and sums the compensated values to approximate the downlink channel state.

Figure 2:
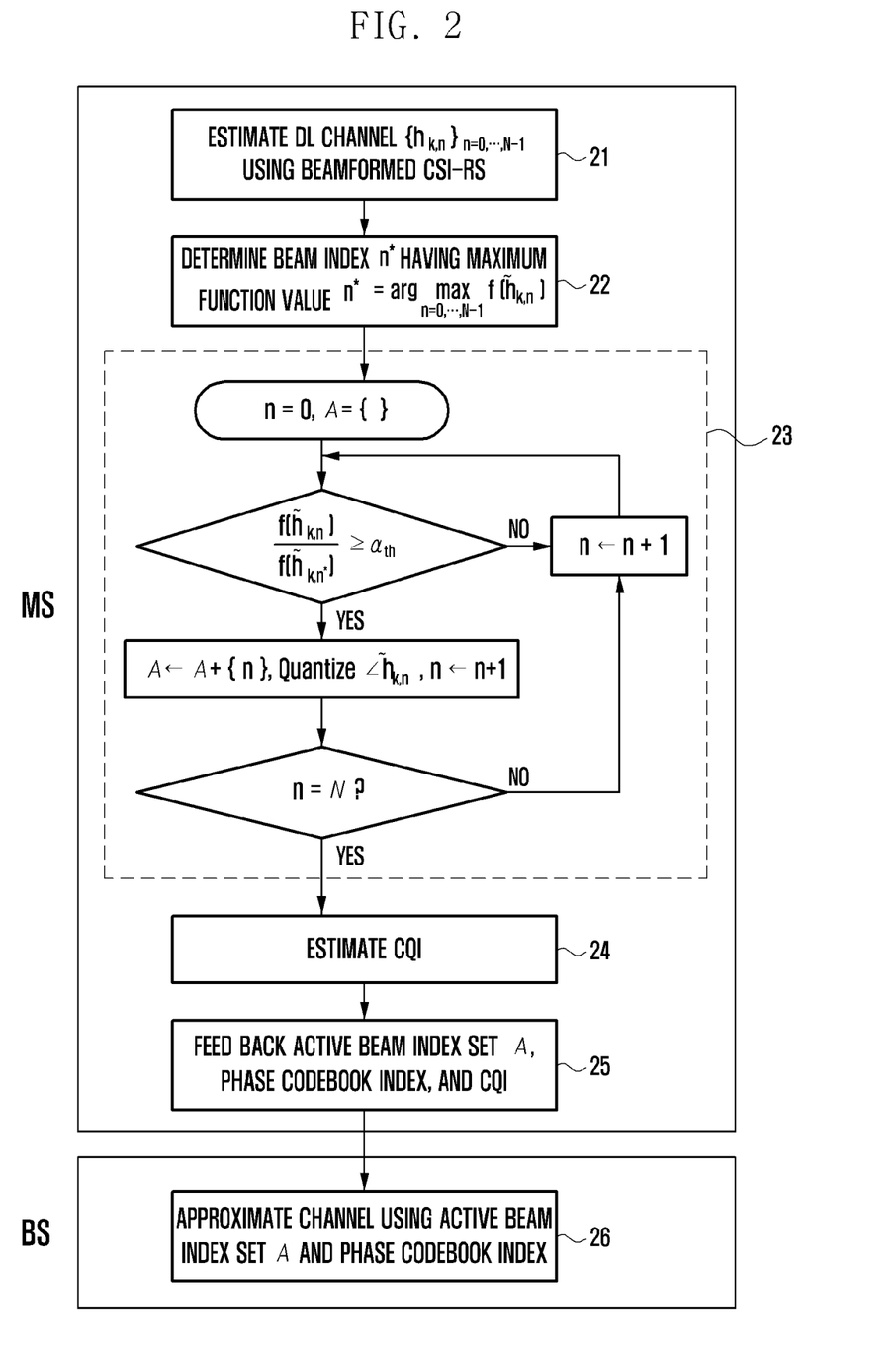
FIG. 2 illustrates the operating procedure of the mobile and base stations in the downlink channel information feedback method for channel approximation with Phase Compensated-Principal Beam Summation (PCPBS) according to an embodiment of the present invention.

FIG. 2 illustrates the operating procedure of the mobile and base stations in the downlink channel information feedback method for channel approximation with PCPBS according to an embodiment of the present invention.

The mobile station estimates N orthogonal per-beam signals of a DownLink (DL) channel at step 21. That is, at step 21 the mobile station estimates the channel vector $\tilde{h}_k$ transmitted as beamformed with vector $\{u_n\}_{n=0,\ldots,N-1}$ and received through the receiver of the mobile station as expressed by Equation (2). The mobile station compares the result values of a certain function $f(\cdot)$ having the input of N channel coefficients $\{\tilde{h}_{k,n}\}_{n=1,\ldots,N}$ with each other to select the beam index $n^*$ having the maximum result value as expressed by Equation (4) at step 22.

The mobile station selects the beam indices having the values over $\alpha_{th}$ multiple of the maximum result value $f(\tilde{h}_{k,n}^*)$ (selected at step 22) and includes the selected indices in the active beam index set A at step 23. The mobile station quantizes, as shown in Formula (7), the phases of the channel coefficients of the beams indicated by the active beam index set A $\{\angle \tilde{h}_{k,n}\}_{n=0,\ldots,N-1}$ or the phase difference $\{\angle \tilde{h}_{k,n}\}_{n\in A} - \angle \tilde{h}_{k,n}*$ from $\tilde{h}_{k,n}*$.

$$\text{Quantize } \angle \tilde{h}_{k,n} \text{ or Quantize } \angle \tilde{h}_{k,n^*} - \angle \tilde{h}_{k,n}, \text{ if } \frac{f(\tilde{h}_{k,n})}{f(\tilde{h}_{k,n^*})} \geq \alpha_{th} \qquad (7)$$

The mobile station performs phase quantization using a phase codebook P shared between the mobile and base stations. The phase quantization is performed to quantize the range of $[0,2\pi]$ regularly. In this embodiment, it is assumed that the codebook as expressed by Equation (8) shown below, is shared between the base and mobile stations to quantize the range of $[0,2\pi]$ regularly at an interval of $\pi/2$. The mobile station selects the value quantized to be mostly approximated to $\{\angle \tilde{h}_{k,n}\}_{n\in A}$ or $\{\angle \tilde{h}_{k,n}\}_{n\in A} - \angle \tilde{h}_{k,n}*$ and determines the corresponding phase index $PI_{A(l)}$ $$\mathcal{P} = \left\{ 0, \frac{\pi}{2}, \pi, \frac{3\pi}{2} \right\} \qquad (8)$$

The mobile station repeats the above procedure for a total of N beam indices.

The mobile station compensates the weight vector $\{u_{A(l)}\}_{l=0,\ldots,L-1}$ indicated by the active beam indices of the set A to the quantized phase value indicated by $\{PI_{A(l)}\}_{l=0,\ldots,L-1}$ at step 24. The mobile station estimates $CQI_A$, i.e. the CQI receivable with the channel vector approximated based on the compensated phase value. It is assumed that the active beam index set A includes L active beam indices.

The mobile station feeds back the active beam index set A, and quantizes phase index $\{PI_{A(l)}\}_{l=0,\ldots,L-1}$, and corresponding CQI, i.e. $CQI_A$ (determined at steps 23 and 24) to the base station at step 25. In order to accomplish this, the following feedback signaling is disclosed.

$\{\mathcal{A}(0), \mathcal{A}(1), \ldots, \mathcal{A}(L-1)\}, \{PI_{A(0)}, PI_{A(1)}, \ldots, PI_{A(L-1)}\}, \{CQI_A\}$:

The selected L active beam indices $\{\mathcal{A}(l)\}_{l=0,\ldots,L-1}$ are grouped to be transmitted in one active beam index message. A phase message including the indices of the codebook for the quantized phase values of channel index phases of individual active beam indices and a summation CQI message $\{CQI_A\}$ receivable with the selected L active beam indices are fed back together.

The base station estimates the downlink channel to the corresponding mobile station using the active beam index information, quantized phase index information, and CQI information fed back by the mobile stations at step 26. The downlink channel vector $\tilde{a}_k$ approximated to each mobile station is calculated by compensating the weight vectors $\{u_{A(l)}\}_{l=0,\ldots,L-1}$ indicated by the L active beam indices $\{\mathcal{A}(l)\}_{l=0,\ldots,L-1}$ with the quantized phase values indicated by the phase indices $\{PI_{A(l)}\}_{l=0,\ldots,L-1}$, summing these compensated values, and normalizing the sum.

The parameters required for determining the active beam index, i.e. $\alpha_{th}$, size of the active beam index set A (i.e. number of beam indices to be included the set), $\beta_{th}$, and phase codebook P, can be set to common or different values for all mobile stations connected to the base station. The base station is capable of transmitting the $\alpha_{th}$, size of the active beam index set A, $\beta_{th}$, and phase codebook P through downlink RRC signaling.

D. Feedback Technique for Channel Approximation with Maximal Ratio Compensated Principal Beam Summation In the feedback method for channel approximation with MRCPBS, the mobile station quantizes the indices of the channel coefficients having a gain equal to or greater than a threshold among the N channel coefficients $\{\tilde{h}_{k,n}\}_{n=1,\ldots,N}$ and their sizes and phases so as to be fed back along with CQI. The transmitter compensates the sizes and phases and adds the compensated sizes and phases to the DFT vector indicated by the beam index to approximate the downlink channel state.

Figure 3:
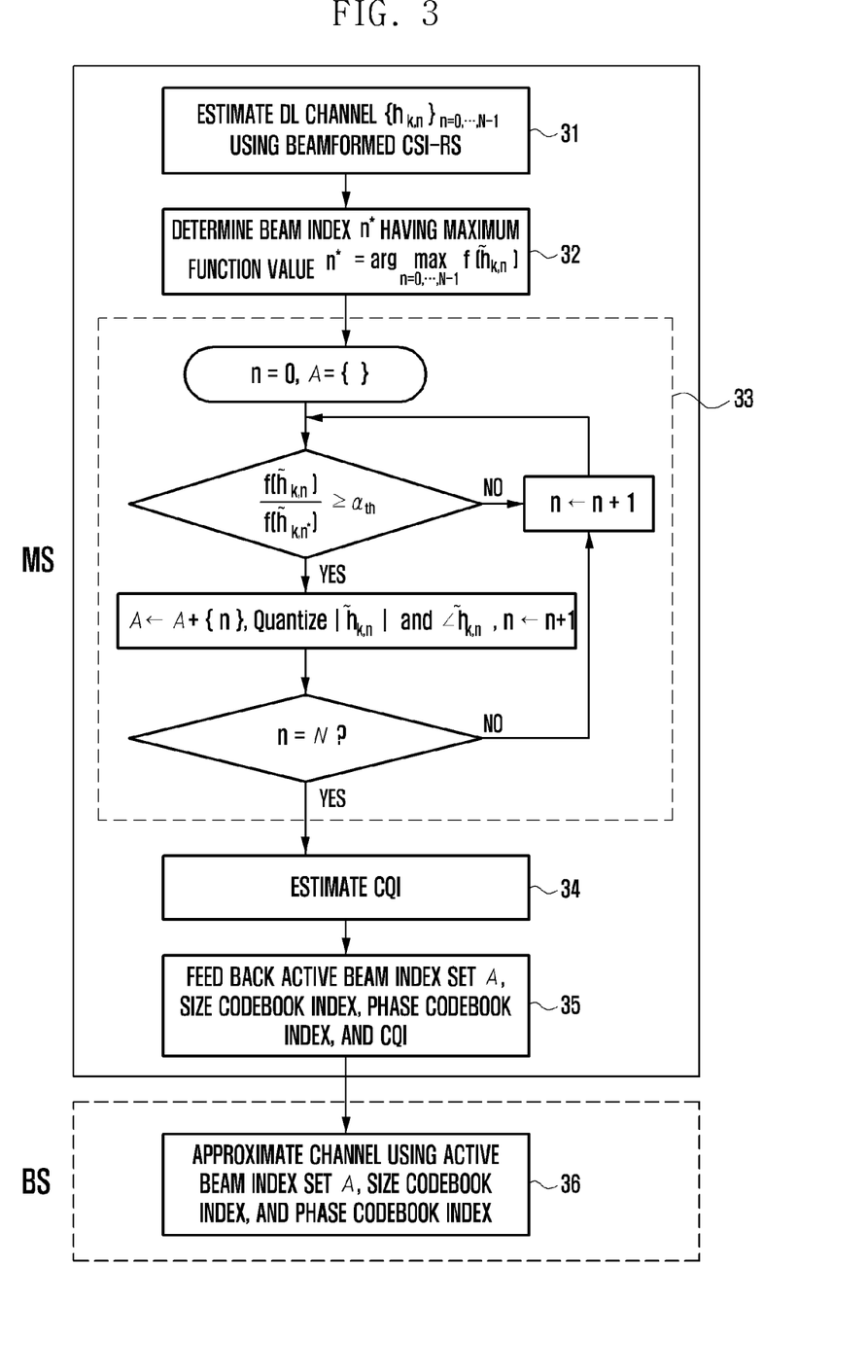
FIG. 3 illustrates the operating procedure of the mobile and base stations in the downlink channel information feedback method for channel activation with Maximal Ratio Compensated Principal Beam Summation (MRCPBS) according to an embodiment of the present invention.

FIG. 3 illustrates the operating procedure of the mobile and base stations in the downlink channel information feedback method for channel activation with MRCPBS according to an embodiment of the present invention.

The mobile station estimates N orthogonal per-beam signals at step 31. That is, the mobile station estimates the channel vector $\tilde{h}_k$ received by the receiver of the mobile station in the form of beams beamformed with the vector $\{u_n\}_{n=0,\ldots,N-1}$.

The mobile station compares the result values of a certain function $f(\bullet)$ with the input of N channel coefficients as expressed by Equation (4) and selects the beam index $n^*$ having the highest result value at step 32. The mobile station selects the beam indices having a multiple of maxim result value $f(\tilde{h}_{k,n}*)$ which is equal to or greater than $\alpha_{th}$ among the result values of the function $f(\bullet)$ of N channel coefficients $\{\tilde{h}_{k,n}\}_{n=1,\ldots,N}$ as expressed by Expression (9) and includes the selected beam indices in the active beam index set A at step 33.

The mobile station quantizes the size $|\tilde{h}_{k,n}|$ and phase $\angle \tilde{h}_{k,n}$ of the channel coefficients of the beams included in the set A, and the channel coefficient size ratios $|\tilde{h}_{k,n}|/|\tilde{h}_{k,n}*|$ and $\{\angle \tilde{h}_{k,n}\}_{n\in A} - \angle \tilde{h}_{k,n}*$ of the beams included in the set A.

$$\text{if } \frac{f(\tilde{h}_{k,n})}{f(\tilde{h}_{k,n^*})} \geq \alpha_{th}, \qquad (9)$$

Quantize $|\tilde{h}_{k,n}|$ and Quantize $\angle \tilde{h}_{k,n}$ or

Quantize $\frac{|\tilde{h}_{k,n}|}{|\tilde{h}_{k,n^*}|}$ and Quantize $\angle \tilde{h}_{k,n^*} - \angle \tilde{h}_{k,n}$.

Using the codebook P for regular phase quantization of the range $[0,2\pi]$ negotiated between the base and mobile stations, the mobile station determines a phase codebook index $\{PI_{A(l)}\}_{l=0,\ldots,L-1}$. Using the size of codebook Q for quantizing the channel coefficient size reflecting a statistic characteristic of the channel coefficient size negotiated amongst the base and mobile stations, the mobile station selects a quantized value most approximate to the channel coefficient size and determines its index $\{AI_{A(l)}\}_{l=0,\ldots,L-1}$.

The mobile station compensates the weight vector $\{u_{a(l)}\}_{l=0,\ldots,L-1}$ indicated by the active beams indices belonging to the set A to the quantized values indicated by the size index $\{AI_{A(l)}\}_{l=0,\ldots,L-1}$ and phase index $\{PI_{A(l)}\}_{l=0,\ldots,L-1}$ at step 34. The mobile station estimates the CQI receivable with the quantized channel vector, i.e. $CQI_A$, using the compensated values.

The mobile station feeds back the active beam index set A, quantized size index $\{AI_{A(l)}\}_{l=0,\ldots,L-1}$, quantized phase index $\{P\,I_{\mathcal{A}(l)}\}_{l=0,\ldots,L-1}$, and estimated CQI $CQI_A$ to the base station at step 35. For this purpose, the following feedback signaling is disclosed.

$$\{\mathcal{A}(0),\ldots,\mathcal{A}(L-1)\},\{A\,I_{\mathcal{A}(0)},\ldots,A\,I_{\mathcal{A}(L-1)}\},\{P\,I_{\mathcal{A}(0)},\ldots,P\,I_{\mathcal{A}(L-1)}\},\{CQ\,I_A\}:$$

The L selected active beam indices $\{\mathcal{A}(l)\}_{l=0,\ldots,L-1}$ are grouped to be transmitted in an active beam index message. The size message carrying indices $\{A\,I_{\mathcal{A}(l)}\}_{l=0,\ldots,L-1}$ in the codebook for the quantized values of channel coefficient size of each active beam index, the phase message carrying the indices $\{P\,I_{\mathcal{A}(l)}\}_{l=0,\ldots,L-1}$ in the codebook for quantized phase value of channel coefficient phase of each active beam index, and the combined CQI $\{CQI_A\}$ message receivable with L selected active beam indices are all fed back together.

The base station estimates downlink channel to the corresponding mobile station using the active beam index information, quantized size index information, quantized phase index information, and CQI information fed back by each mobile station at step 36. The downlink channel vector $\tilde{\alpha}_k$ approximated to each mobile station is calculated by compensating the weights $\{u_{\mathcal{A}(l)}\}_{l=0,\ldots,L-1}$ indicated by the L active beam indices $\{\mathcal{A}(l)\}_{l=0,\ldots,L-1}$ with the quantized size value indicated by $\{A\,I_{\mathcal{A}(l)}\}_{l=0,\ldots,L-1}$ and quantized phase value indicated by $\{P\,I_{\mathcal{A}(l)}\}_{l=0,\ldots,L-1}$, summing the compensated values, normalizing the compensated values.

The parameters required for determining the active beam index, i.e. $\alpha_{th}$, size of the active beam index set A (i.e. number of beam indices to be included the set), $\beta_{th}$, phase codebook P, and size codebook Q can be set to common or different values for all mobile stations connected to the base station. These parameters can be set differently for respective mobile stations. In order to share the parameter information among base and mobile stations, the base and mobile stations may negotiate according to a standard or the base station may transmits the $\alpha_{th}$, size of the active beam index set A, $\beta_{th}$, phase codebook P, and size codebook Q through downlink RRC signaling.

E. Performance Analysis

Figure 4:
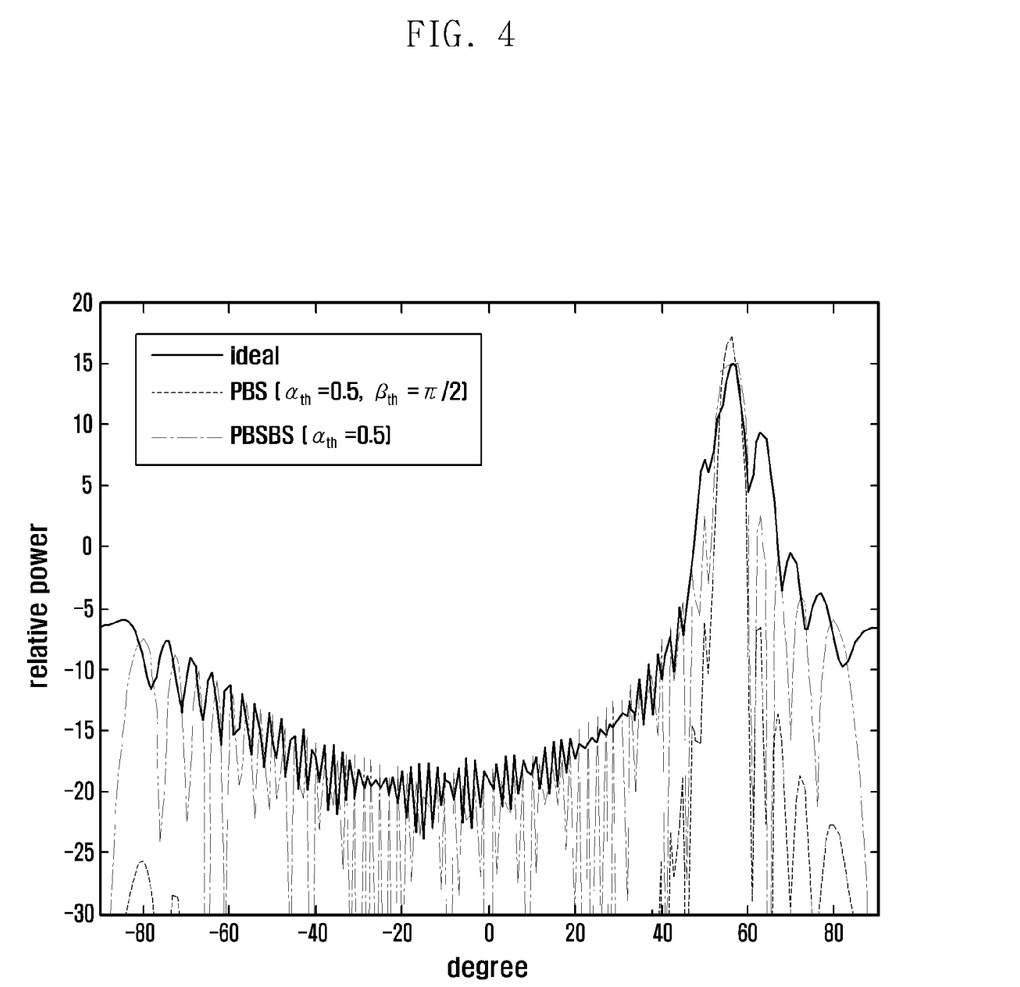
FIG. 4 illustrates the channel approximation performance of the feedback method according to an embodiment of the present invention.

FIG. 4 illustrates the channel approximation performance of the feedback method according to an embodiment of the present invention in the massive MIMO system using 64 transmit antennas in which the transmitter angular spread is 15 degrees and the average Signal-to-Noise Ratio (SNR) for all mobile stations is 5 decibels (dB). The feedback method for channel approximation with PBS feeds back average 2.2 active beam indices per mobile station and corresponding CQIs under the assumption of $\alpha_{th}=0.5$. The feedback method for channel approximation with PCPBS feeds back average 3.3 active beam indices and 2-bit active beam index and 2-bit quantized phase per active beam index for corresponding active beam indices and QCI under the assumption of $\alpha_{th}=0.5$ and $\beta_{th}=\pi/2$. This indicates that the disclosed feedback methods for channel approximation with PBS and PCPBS approximate the downlink channel state efficiently with a very limited resource amount.

Figure 5:
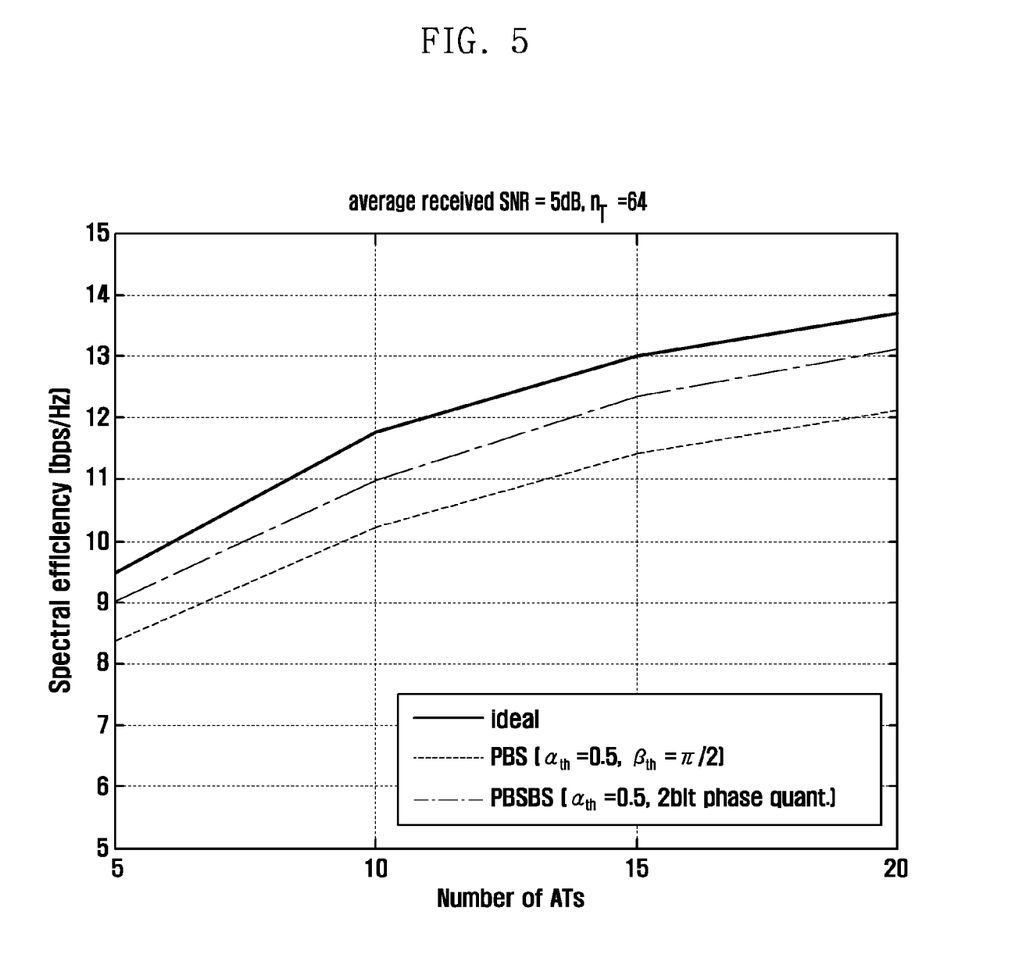
FIG. 5 illustrates simulation results with respective to the system throughputs of the disclosed method and the Space Division Multiple Access (SDMA) method in the same system and channel environment as FIG. 4.

FIG. 5 illustrates simulation results with respective to the system throughputs of the disclosed method and the SDMA method in the same system and channel environment as FIG. 4. In the simulation result, the feedback methods for channel approximation with PBS and PCPBS according to the disclosed method shows the system throughput near the ideal throughput (when the downlink channel state from the base station to the mobile station are precisely known) using the limited amount of feedback information.

Figure 6:
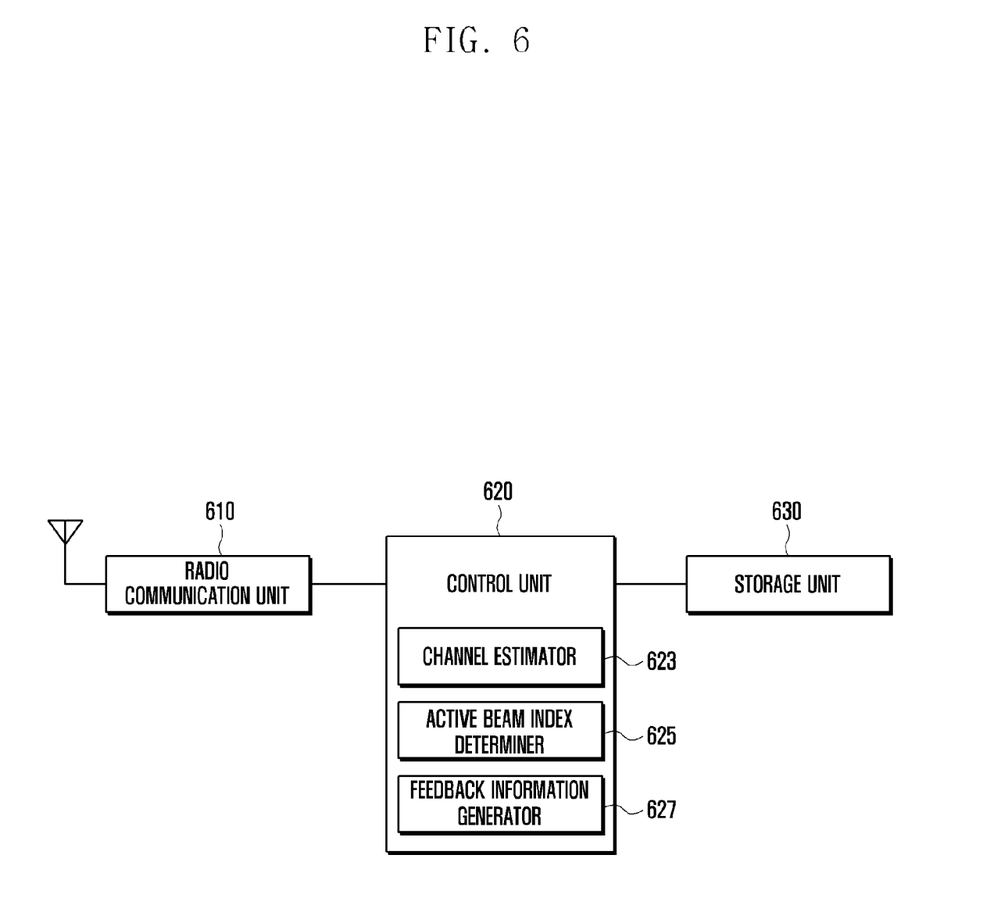
FIG. 6 illustrates the configuration of the mobile station according to an embodiment of the present invention.

FIG. 6 illustrates the configuration of the mobile station according to an embodiment of the present invention.

Referring to FIG. 6, the mobile station includes a radio communication unit 610, a control unit 620, and a storage unit 630.

The radio communication unit 610 denotes the receiver of the mobile station and is responsible for communicating signals with a base station. The radio communication unit 610 receives channel coefficients from the base station, and is capable of feeding back at least one of active beam index set, phase indices, size index, and channel state information under the control of the control unit 620.

The control unit 620 quantizes the channel coefficients received from the base station to feed back. To do so, the control unit 620 includes a channel estimator 623, an active beam index determiner 625, and a feedback information generator 727.

Specifically, the channel estimator 623 estimates the channel vector composed of N channel coefficients, and defines a function of channel coefficient size, transmittable data rate, and receivable SINR with the input of N channel coefficients.

The active beam index determiner 625 determines the beam indices available for feedback. Specifically, the active beam index determiner 625 compares the function values with each other to select the beam index n* as the maximum result value. The active beam index determiner 625 selects the beam index having a multiple of maximum results which is equal to or greater than $\alpha_{th}$ among the result values of the function and of which channel coefficient have the phases of the phase threshold value $\beta_{th}$ to configure an active beam index set.

The active beam determiner 625 quantizes the channel coefficient phases of the beams indicated by the indices constituting the active beam index set or phase difference between the channel coefficient and maximum result value using the phase codebook shared with the base station. The active beam index determiner also quantizes the sizes and phases of the beams indicated by the indices constituting the active beam index set using a phase codebook shared with the base station and the size ratios of the beams using a size codebook shared with the base station.

The active beam index determiner 625 selects the quantized value to be mostly approximated to the channel coefficient phase among the quantized values and determines at least one phase index and size index corresponding to the selected value. The active beam index determiner 625 estimates CQIs for the indices of the respective beams constituting the active beam index set. The active beam index determiner 625 also compensates the weight vectors indicated by the indices of the beams constituting the active beam index set with the quantized phase or size value to estimate the receivable CQI.

The feedback information generator 627 generates the information on the active beam index set determined by the active beam index determiner 625 and the estimated CQI to be fed back to the base station. The feedback information generator 627 generates the information on at least one phase index or size index as the index value determined according to the phase quantization or size quantization.

The control unit 620 controls the radio communication unit 610 to transmit the information on at least one of the active beam index set, phase index, size index, and CQI to the base station.

The storage unit 630 stores programs and data associated with the operations of the mobile station.

The feedback method of the present invention forms beams per signal and allocates a resource for a plurality of beams capable of suppressing intra-channel interference with the high spatial interference suppression performance of the massive MIMO system. As a consequence, it is a possible to reduce the resource amount necessary for CSI-RS transmission without performance degradation.

The feedback method of the present invention also feeds back downlink CSI from the mobile station to the base station efficiently using a limited amount feedback information in the massive MIMO system operating in FDD mode. The feedback method of the present invention enables the massive MIMO transmitter to perform beamforming on the per-beam signals with plural weight vectors.

The feedback method of the present invention also quantizes a small number of principal downlink channel coefficients having beamforming channel gains equal to or greater than a value and feeds back the quantized principal downlink channel coefficients. The feedback method for channel approximation with PBS operates in such a way that the mobile station feeds back the active beam index, i.e. the index of the beamforming weight providing channel gain equal to or greater than a value along with CQI and the transmitter approximates the downlink channel state by summing the beamforming weight vectors indicated by the weight indices fed back.

The feedback method for channel approximation with PCPBS operates in such a manner that the mobile station quantizes active beam indices and phases of the channel coefficients and feeds back the quantized results with CQI and the transmitter compensates beamforming weight vectors indicated by the weight indices with the received phase and sums the compensated values to approximate the downlink channel state. The feedback method for channel approximation with MRCPBS operates allows the mobile stations to quantize the active beam indices and sizes and phases of the channel coefficients and feeds back the quantized result with CQI and the transmitter compensates the sizes and phases with the beamforming weight vectors indicated by the weight indices and sum the compensation results to approximate the downlink channel state.

The RRC signaling method of the present invention allows the base station to transmit the parameters required for determining active beam indices to share the parameters with the mobile stations.

Although embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A channel state information feedback method of a mobile station in a massive Multiple-Input Multiple Output (MIMO) system, the method comprising: receiving N beams from a base station:
   estimating a channel vector comprising N, which is a nonnegative integer value, channel coefficients of each N beams transmitted from the base station;
   comparing result values of a function having an input of the N channel coefficients to each other;
   selecting an index of a beam formed with a maximum value of the result values;
   selecting indices of beams, when result values of the beams are greater than or equal to a threshold value multiplied by the maximum value of the result value and a difference between phases of the channel coefficient of the beams and a phase of the beam formed with the maximum value of the result values is less than or equal to a phase threshold value:
   generating an active beam index set including the selected indices of beams; estimating channel state information on the active beam index set; and feeding back the channel state information and the active beam index set to the base station, and
   wherein the N beams are generated based on N beamforming vectors of size M by the base station, and
   the size M is associated with a number of transmit antennas of the base station.

2. The method of claim 1, wherein generating the active beam set comprises:
   quantizing phases of the channel coefficients of the selected indices of beams or phase differences between the channel coefficients of the selected indices of beams and a phase of the beam formed with the maximum value of the result values;
   determining phase indices corresponding to the selected indices of beams according to the quantized phases; and
   compensating weight vectors indicated by the selected indices of beams with phase values indicated by the phase indices.

3. The method of claim 2, wherein determining the phase indices comprises selecting the phase indices from a phase codebook for phase quantization, wherein the phase codebook is known to the base station and mobile station.

4. The method of claim 2, wherein feeding back the channel state information and the active beam index set comprises transmitting the quantized phase indices and channel state information corresponding to the quantized phase indices of the selected indices of beams.

5. The method of claim 1, wherein generating the active beam index set comprises:
   determining phase indices and size indices by quantizing sizes, phases, and size ratios of the channel coefficients of the beams indicated by the selected indices of beams; and
   compensating weight vectors indicated by the selected indices of beams with quantized values indicated by the phase indices and the size indices.

6. The method of claim 5, wherein determining the phase and size indices comprises selecting the phase indices and the size indices from a phase codebook for phase quantization and a size codebook for size quantization, wherein the phase codebook and size codebook are known to the base and mobile station.

7. The method of claim 5, wherein feeding back the channel state information and the active beam index set comprises transmitting the phase indices, the size indices, and channel state information corresponding to the phase and size indices of the selected indices of beams.

8. A channel state information feedback apparatus, the apparatus comprising:
   a radio communication receiver which receives, via at least one antenna, N, which is a nonnegative integer value, beams from a base station;
   a channel estimator which estimates a channel vector comprising N channel coefficients of each N beams transmitted from the base station;
   an active beam index determiner which compares result values of a function having input of the N channel coefficients to each other, selects an index of a beam formed with a maximum value of the result values, selects indices of beams, when result values of the beams are greater than or equal to a threshold value multiplied by the maximum result value and a difference between phases of the channel coefficient of the beams and a phase of the beam formed with the maximum value of the result values is less than or equal to a phase threshold value, generates an active beam index set including the selected indices of beams;

a feedback information generator which estimates channel state information on the active beam index set; and a control unit which feeds back the channel state information and the active beam index set to the base station, and wherein the N beams are generated based on N beamforming vectors of size M by the base station, and the size M is associated with a number of transmit antennas of the base station.

9. The apparatus of claim 8, wherein the active beam index determiner quantizes phases of the channel coefficients of the selected indices of beams or phase differences between the channel coefficients of the selected indices of beams and a phase of the beam formed with maximum result value of the result values, determines phase indices corresponding to the selected indices of beams according to the quantized phases, and compensates weight vectors indicated by the selected indices of beams with phase values indicated by the phase indices.

10. The apparatus of claim 9, wherein the control unit feeds back the quantized phase indices and channel state information corresponding to the quantized phase indices of the selected indices of beams.

11. The apparatus of claim 8, wherein the active beam index determiner determines phase indices and size indices by quantizing sizes, phases, and size ratios of the channel coefficients of the beams indicated by the selected indices of beams, and compensates weight vectors indicated by the selected indices of beams with quantized values indicated by the phase indices and the size indices.

12. The apparatus of claim 11, wherein the control unit feeds back the phase indices, the size indices, and channel state information corresponding to the phase and size indices of the selected indices of beams.

* * * * *